United States Patent [19]

Lemelson et al.

[11] Patent Number: 5,731,785
[45] Date of Patent: Mar. 24, 1998

[54] SYSTEM AND METHOD FOR LOCATING OBJECTS INCLUDING AN INHIBITING FEATURE

[76] Inventors: Jerome H. Lemelson, Suite 286, Unit 802 930 Tahoe Blvd., Incline Village, Nev. 89451-9436; Robert Pedersen, 7808 Gleneagle, Dallas, Tex. 75248

[21] Appl. No.: 242,368

[22] Filed: May 13, 1994

[51] Int. Cl.[6] .................... G01S 5/02; G01S 1/08; H04B 7/185
[52] U.S. Cl. .................... 342/357; 342/386; 342/457
[58] Field of Search .................... 342/357, 386, 342/457; 340/825.49, 825.45, 825.31, 825.34, 573

[56] References Cited

U.S. PATENT DOCUMENTS

| | | | |
|---|---|---|---|
| 4,860,352 | 8/1989 | Laurance et al. | 342/357 |
| 5,012,335 | 4/1991 | Cohodar | 358/108 |
| 5,223,844 | 6/1993 | Mansell et al. | 342/357 |
| 5,334,974 | 8/1994 | Simms et al. | 340/990 |
| 5,406,324 | 4/1995 | Roth | 348/22 |
| 5,414,444 | 5/1995 | Britz | 345/156 |
| 5,418,537 | 5/1995 | Bird | 342/457 |
| 5,485,163 | 1/1996 | Singer et al. | 342/457 |
| 5,488,558 | 1/1996 | Ohki | 364/449 |
| 5,497,149 | 3/1996 | Fast | 340/988 |
| 5,508,736 | 4/1996 | Cooper | 348/144 |
| 5,515,043 | 5/1996 | Berard et al. | 340/988 |
| 5,557,254 | 9/1996 | Johnson et al. | 340/426 |

*Primary Examiner*—Gregory C. Issing
*Attorney, Agent, or Firm*—Louis J. Hoffman

[57] ABSTRACT

A system and method are provided for communicating between a person, object, and/or vehicle carried transceiver and a monitor station to locate and track the movement of the same for security or anti-crime purposes. A portable computing and communication device carried by a person or located (hidden) in an object generates and transmits via radio signals a plurality of codes when remotely activated. One (or more) code(s), identifying or descriptive of the person, object or vehicle to be tracked, is (are) generated and transmitted to a monitor station to display character and/or video picture information describing and/or physically displaying a picture of a select person and/or vehicle and license plate information to permit police or security personnel to recognize the same. Such coded information may be immediately transmitted or retransmitted from the monitor station to a radio receiver carried by a policeman or in one or more police vehicles. The portable device is equipped with location sensing capability, such as receiving signals from satellites such as from the GPS constellation, and a computer for calculating its position using triangulation methods. Transmission of the position signals from the portable device is inhibited for a time by entering thereat an inhibit personal identification number (PIN). Further, PINs are used by the monitoring station to activate and/or override the inhibiting feature.

53 Claims, 4 Drawing Sheets

SYSTEM AND METHOD FOR LOCATING OBJECTS INCLUDING AN INHIBITING FEATURE

BACKGROUND OF THE INVENTION

Various attempts have been made to use the satellite-based global positioning system ("GPS") to use location information about persons or objects such as automobiles. U.S. Pat. No. 5,223,844 issued in 1993 to Mansell et al., for example, discloses a system in which a human or an automated alarm system at an automobile can issue a command directing that location information be transmitted by cellular telephone connection to a central monitoring location. It is not disclosed, however, to use the onboard GPS system to locate stolen cars or missing items or persons, by commanding the GPS unit to generate and transmit location and other data upon a signaled request from a central station. It is also not disclosed to initiate the command only at the request of an authorized person, whether that person is located near or far from the central station.

SUMMARY OF THE INVENTION

This invention relates to a system and method for automatically communicating location and descriptive information between an object, such as a person or a motor vehicle or other property, and a monitor station for security purposes in order to protect the object from abduction or theft. The system preferably employs an electronic code generating system or device carried by the object in a portable housing which is hidden from view and which, upon becoming battery (or solar cell) activated via remote or local control signals, generates a plurality of coded signals for transmission to a monitoring station. Such coded signals contain identifying and/or descriptive information relating to the object as well as location indicating information as described below. The coded signals are generated and short wave transmitted to a radio receiver at a central location such as a police or security service monitor station. The coded signals may then be employed by a computer at the monitor station to query a database containing information about various subscribers to the system and effect the reproduction of select information in the form of descriptive codes and/or video picture information at a local electronic display. Such select information may describe and/or illustrate physical features of the object or consist of other identifying data such as the license plate number of a motor vehicle. Additional coded signals may be immediately radio transmitted from the monitor station to a sub-monitor station, such as a radio receiver in a police vehicle, which, when decoded, are used to display and/or generate sounds of speech indicating the residence or business address of the subscriber or the location of the subscriber based on previously generated data transmitted from the portable or vehicle mounted electronic code generating system to the monitor station.

The portable device includes electronic circuitry for receiving precisely timed location indicating signals from satellites such as used in an available GPS (Global Positioning System) or from other radio location indicating systems. The location of the object is calculated, and the location information is encoded along with descriptive and/or object identifying information into the coded signals transmitted to the monitor station. Such location indicating codes are generated and transmitted to the monitor station at select time intervals, or upon a signaled request from the monitor station, which codes are employed thereat to locate and track the travel of the person, vehicle, or other object. Code signals may also be generated and transmitted as shortwave signals to one or more of multiple orbiting satellites which relay the received signals to ground based monitoring stations as code signals which are repeated from time to time and which activate a system for locating the person, vehicle, or other object carrying the device. Using information recorded in memory and comparing same with satellite and/or ground station tracking signals so generated, the monitor station computer generates code signals which when applied to an electronic display and/or speaker, located at either the monitor station or at a submonitor station such as a police vehicle, intelligibly indicate the instant location, path or street of travel of the person or vehicle, and/or the speed and direction thereof. Such information is updated and repeated from time to time by means of new location indicating code signals as computed from the earth satellite signals received.

Accordingly it is a primary object of this invention to provide a new and improved system and method for automatically computing, communicating and using identification and location defining information.

Another object is to provide an electronic system and method for automatically identifying and locating persons in distress.

Another object is to provide an electronic system and method for locating and tracking a persons being abducted.

Another object is to provide an electronic system and method for detecting theft of an object, such as a motor vehicle, and automatically tracking the movement of same.

Another object is to provide an electronic system and method for monitoring the movement of an object, such as a motor vehicle or person, and remotely indicating its direction, speed of travel and street along which such object is traveling.

The above objects and other advantages will appear in the following description and appended claims, reference being made to the accompanying drawings forming a part of the specification wherein like reference characters designate corresponding parts in the several different representations of the disclosed satellite object location system.

DETAILED DESCRIPTION OF THE INVENTION

Figure 1:
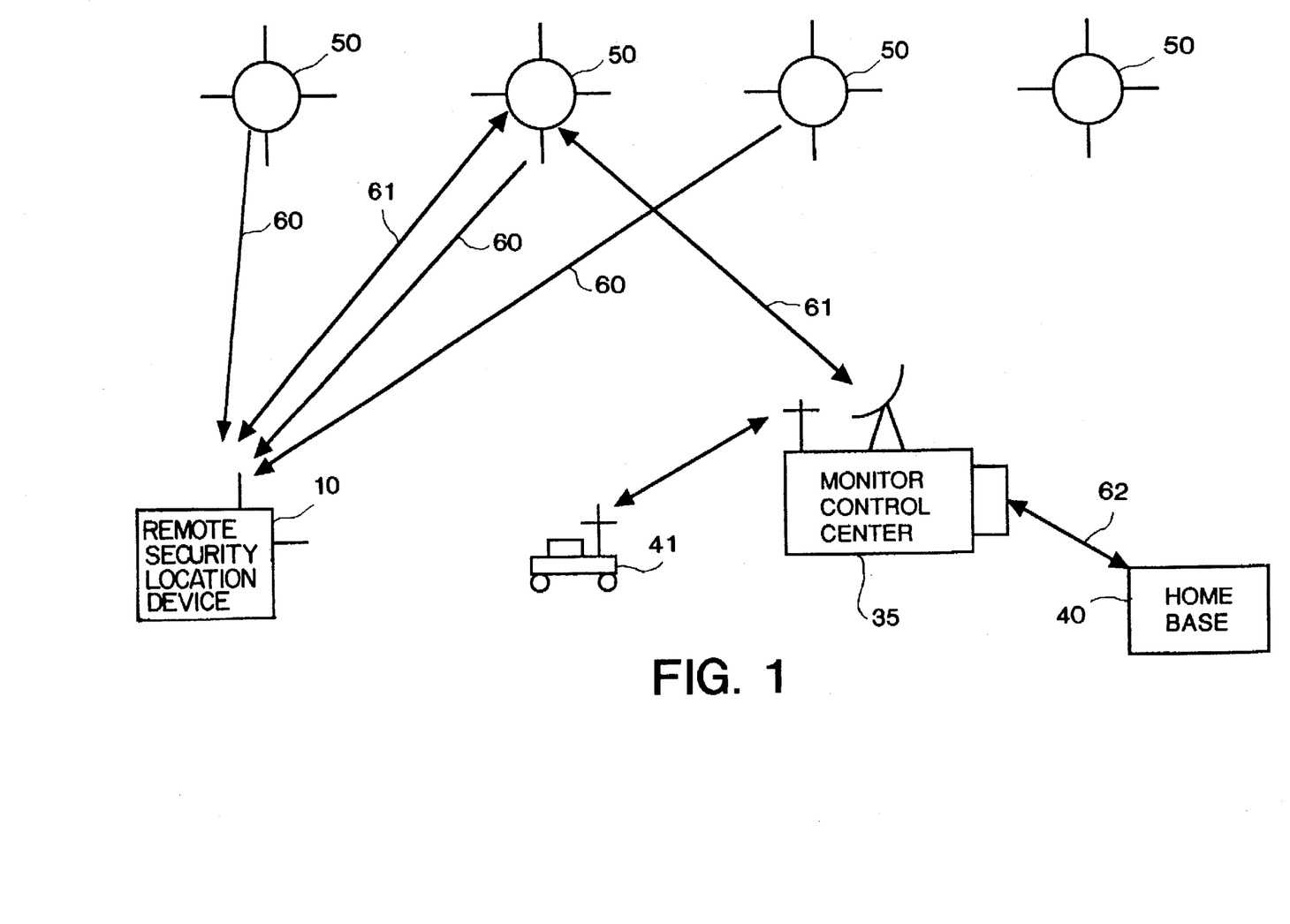
FIG. 1 illustrates a satellite location system using satellites communicating with a global positioning system computer and a monitor control center.

FIG. 1 illustrates an embodiment of a person/vehicle/object locating system using a plurality of satellites 50 such as those used in the presently available global positioning system (GPS). The GPS satellites transmit via down link signals 60, precisely timed, coded signals to enable remote portable devices to precisely determine their location on the earth's surface. Signals from multiple satellites are employed and triangulation algorithms are used wherein positions are determined based on differences in signal propagation delay. The remote GPS unit 10 of FIG. 1 contains the necessary electronics to compute the location of such portable device and the person or vehicle carrying same based on signals received from the satellites 50. The remote unit 10 also communicates via two-way radio links 61 with a monitor control center 35. (See eg., Briskman, R. D., "Radio Determination Satellite Service," *Proceedings of the IEEE*, vol. 78, no. 7, pp. 1096–1106, July 1990.) The two-way radio links are illustrated as including the same GPS satellites that transmit the down link location signal 60. Coded coordinate indicating signals from the remote unit 10 are received at the monitor control center 35 and indicate the position of the remote unit 10. A database accessible by the monitor station may be used to correlate the transmitted GPS coordinates to conventional location indications such as street addresses. Other codes transmitted to the monitor control center 35 identify or describe the person or vehicle carrying the remote portable unit. The coded information may be transmitted by satellite or other radio networks such as cellular telephone networks to the monitor station, from where they are employed to display information and permit tracking and interception of the location-tagged object or person. Signals from the monitor control center 35 may in turn be relayed to mobile unit 41 in the vicinity of the remote unit 10 via radio link and indicate the location and description of the remote unit 10.

For example, the mobile unit 41 may be a police vehicle and may short wave receive information from the monitor control center 35 indicating precisely where the remote unit 10 is located on the surface of the earth. Vehicle 41 may then be dispatched or proceed accordingly to the location of the remote unit 10 to recover the object or vehicle or otherwise provide assistance to the person or vehicle carrying such unit.

Also shown in FIG. 1 are connections via telephone lines 62 extending to the home base 40 which may, for example, represent the home of a person, vehicle or object containing the remote unit 10. In a typical scenario, the home base system 40 may be a subscriber to the location system used to locate or otherwise report the status of such remote unit 10, the latter being attached to or concealed on the person or in the vehicle having the home base 40. The remote unit 10 may also be located in objects that are normally kept at the home base 40 or under control of the home base 40. With the system herein described, subscribers from the home base 40 may query the remote unit 10 via the monitor control center 35 to determine the precise location of the remote unit 10. This may be used, for example, to determine the instant location of a person under surveillance, from the home base 40 or to locate an object or a vehicle which may be missing or stolen from the home base.

In a similar manner, the remote unit 10 may periodically report its location and status through monitor control center 35 depending upon operational parameters and capabilities of the remote unit 10. Such capability may be used, for example, to program and/or remotely control the remote unit 10 to cause it to generate and transmit codes defining periodic updates to the monitor control center 35. Prescribed areas of movement of the remote unit 10 may be predefined with an alarm sounded via monitor control center 35 in the event the remote control unit 10 is found to have traveled outside the designated area in which it is permitted to travel and/or into select areas it is not permitted to travel. Appropriate signals may then be dispatched to the vehicle 41 to locate or retrieve the unit 10 and/or to the home base unit 40 to report the violation of the predefined area by the remote unit 10.

Figure 2:
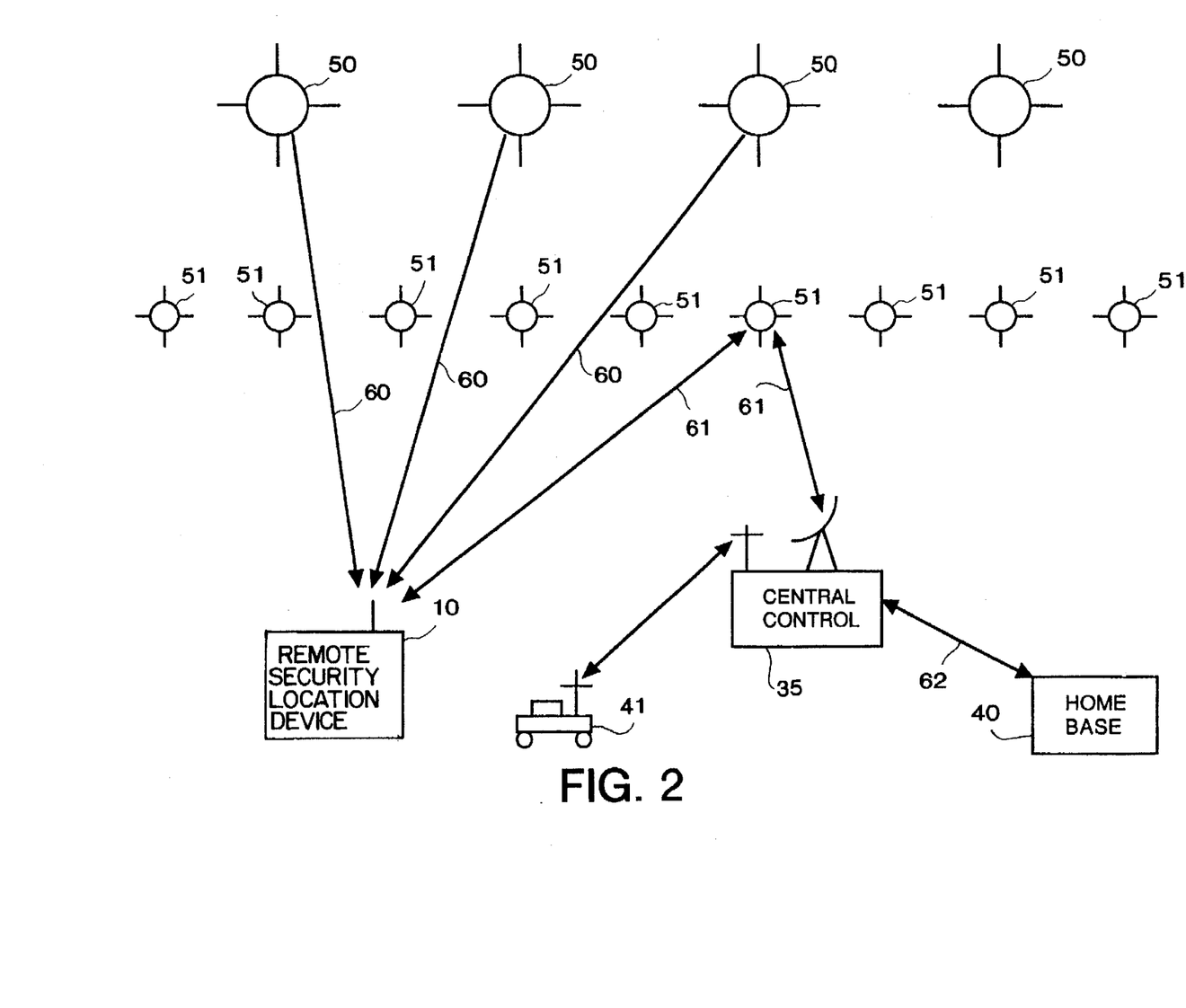
FIG. 2 is a schematic representation of the satellite object location system using GPS satellites together with low orbiting earth satellites for two-way communication between the remote security location device and the central control system.

FIG. 2 illustrates an embodiment of the person/vehicle/object locating system utilizing a combination of GPS satellites 50 and low orbiting earth satellites 51 for precisely locating and communicating with the monitor control center 35. This approach is particularly advantageous for minimizing the power and antenna requirements of the portable remote electronics unit while, at the same time, providing potentially worldwide coverage for the herein disclosed security system. Using the system of FIG. 2, precise location is possible without the requirement to transmit any signal from the remote unit 10 to high orbiting GPS navigation satellites. For example, the now operational GPS satellite system provides worldwide coverage with passive, compact, ground based receivers. The system operates using precisely timed signals transmitted from multiple satellites. Precise locations within a few feet can be determined for any location on earth. Receivers measure relative time delays from multiple satellites and compute the locations of the receiver using triangulation methods.

Low orbiting earth satellites of the type planned for the Iridium system (See Asker, J. R., "Motorola Proposes 77 Lightsats For Global Mobile Phone Service," *Aviation Week & Space Technology*, p. 29, Jul. 2, 1990) will permit economical two-way radio communication between any two points on earth. The low-orbiting satellites 51 are not, however, used for navigation purposes. Their lower earth orbits win permit much lower power transmitters for the ground to satellite link 61 of FIG. 2, removing the burden of high power and complex antenna requirements on the ground based portable unit. This lower power configuration for the ground to satellite link is important for the economical, compact configuration required in the portable systems.

The use of two-way communication permits identification of the remote unit 10 to the monitor control center 35 and querying of the remote to determine its location and status. The ability to poll the remote portable unit 10 from the monitor control center 35 can be useful in the location of lost, stolen or kidnapped objects or persons. At the same time, certain situations will require privacy where an actual person or the owner of a particular object such as a vehicle will not want arbitrary polling and determination of location. Security is a requirement in many situations.

Security may be provided in the system herein disclosed using personal identification numbers (PIN's). Combining the PIN number with the standard ID code for a portable unit permits unique identification with only authorized access to the portable unit's location. For example, in the case of a personal vehicle the owner may not want to be tracked while using the vehicle at certain times. However, if the vehicle is stolen, the owner can remotely activate the remote 10 and determine its location by using the unique PIN code. Similarly, in the case of a portable location device carried by a person, it may not be desirable to permit arbitrary access to the person's location without the use of the PIN. Different levels of security are provided by implementing the option of having PIN entry directly at the portable unit 10 (such as on keyboard 26, see FIG. 3) and from the monitor control center 35 (such as on input 42I, see FIG. 4). This feature permits flexible use of the location system without disabling the portable unit 10. For example, the system can be configured for various operational modes with different access options. Typical uses include at least the following:

1) No use of PIN's—permits location determination and two-way communication without special access codes.
2) PIN's from monitor control center only—permits secure controlled access for polling and querying a remote for location and other status. The PIN may also be provided from the home base 40 see FIG. 1.
3) PIN use from remote only—permits controlled access from the remote for privacy without turning off or otherwise absolutely disabling operation. If, as stated above, the owner wishes to block the monitor's access to the location information calculated by the portable unit, then the owner may enter an inhibiting PIN code into unit 10, such as with keyboard 26 (see FIG. 3). Microprocessor 12 acts as a code-matcher or comparator as is well-known in the art by comparing the entered PIN code with a value stored in a memory in unit 10, such as in ROM 13 RAM 14 or memory 21, and if a match is detected microprocessor 12 disables transmission of location signals. It is possible in this mode to permit emergency overrides allowing access to the portable unit from the monitor control center if authorized by a higher level emergency PIN transmitted from the code station or, for example, after a predetermined and agreed upon time interval during which the remote devices have the requisite and agreed upon privacy.
4) Combination PIN's—permits the highest level of security requiring PIN's from both ends before access is granted to location data from the remote.

Other combinations and uses of secure access arrangements are possible, for example, encryption of data communicated between the remote portable unit and the monitor control station. For example, the coded signals containing identity and location information can be transmitted in encrypted form to a select monitor station by means of a specific public key, said encrypted code signal being decipherable only with the use of a corresponding private key.

Figure 3:
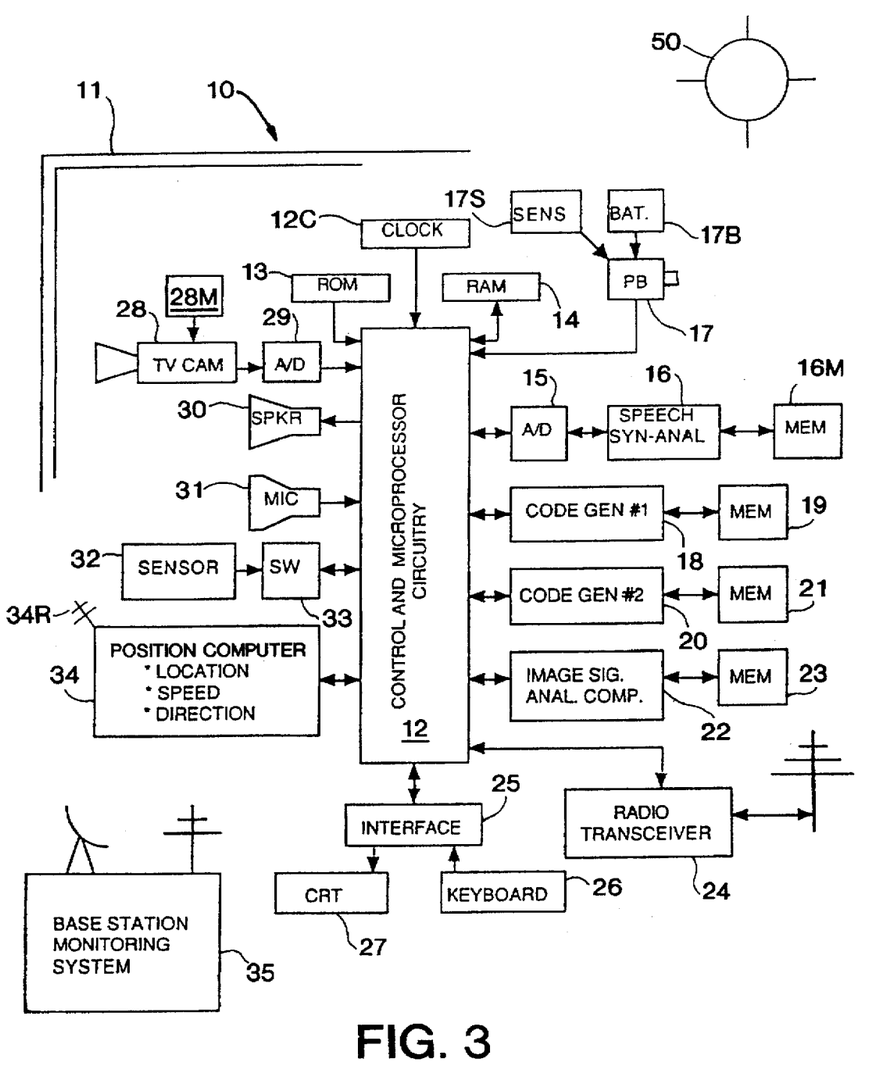
FIG. 3 is a block diagram representation of the remote location security device.

FIG. 3 shows details of one embodiment of the remote unit 10 for monitoring, tracking and protecting objects from theft and/or persons in distress or being abducted. System 10 includes a portable or otherwise movable subsystem supported within a housing 11. The unit 10 may be concealed or hidden on or carried by a person or carried or hidden within a motor vehicle. The housing 11 contains control circuitry including a microprocessor or computer 12 for controlling the generation and radio transmission of a plurality of code signals to the monitor control center 35 and a position locating system 34 comprising an electronic position computer that calculates location, speed, and direction by radio triangulation using signals received on a receiver 34R from GPS satellites, one of which 50 is shown in FIG. 3.

Connected to control and microprocessor circuitry 12 are a read-only (ROM) memory 13 and a random access (RAM) memory 14 for storing digital data which is selectively retrievable via control and microprocessor circuitry 12: digital-to-analog converter 15 for digitizing analog signals such as speech or sound signals output by a microphone 31 supported by housing 11 for communicating speech information via a radio transceiver 24, connected to the microprocessor circuitry 12.

A switch 17, such as a manual push-button, normally open switch or a switch operated by sound, motion or other signals generated by one or more sensors 17S is used to activate the unit 10 by closing a switch 17 which connects a battery 17B to the microprocessor circuitry 12 and the subsystems connected thereto to energize or activate same. Once so activated, operation is under control of an electronic clock or timer 12C. In one form of cycle initiation, a speech signal analyzing computer 16 with attendant memory 16M analyzes the speech signals output by microphone 31, such as select sounds of words spoken by a person seeking protection, and generates control signals for closing switch 17 or otherwise activating the circuitry in housing 11. Unit 10 may also be activated by a control signal transmitted from monitor station 35 to transceiver 24. The control signal may consist of the standard ID code identifying the particular unit 10 and or may also include an activating personal identification number. Upon receipt at radio transceiver 24 of the control signal, microprocessor 12 may act as a code matcher or comparator as is well-known in the art, attempting to match the received ID code with an identification code stored in memory at the object, for example generated by a first code generator 18 from associated memory 19, and microprocessor 12 may attempt to match the received activating PIN (if present) with a PIN stored in memory, for example generated by a second code generator 20 from associated memory 21 or stored in ROM 13 or RAM 14. If microprocessor 12 detects a match, then unit 10 is activated. When so activated, first code generator circuit 18 applies first signals in the form of one or more identifying codes to radio transceiver 24 through control and microprocessor circuitry 12.

Figure 4:
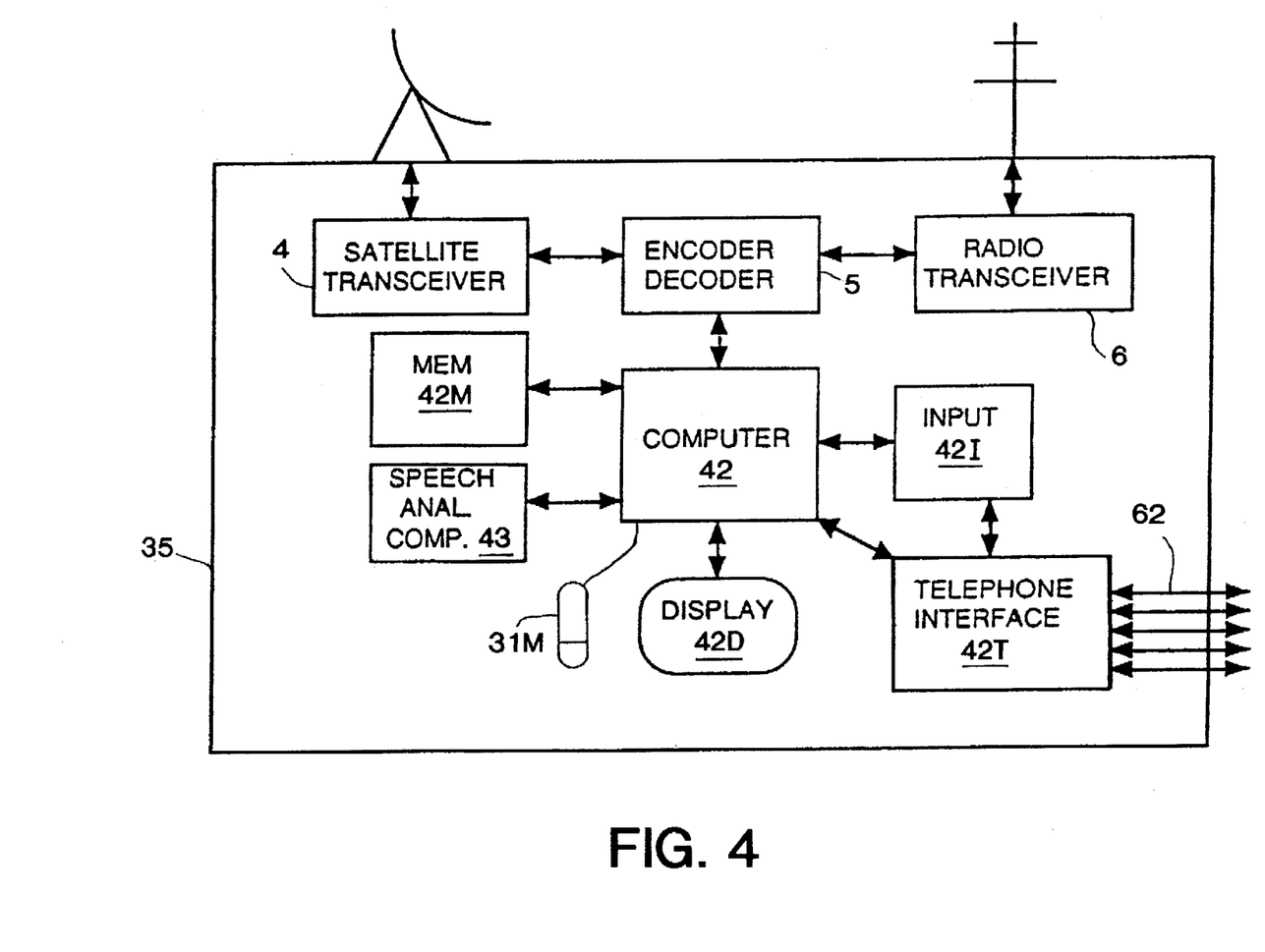
FIG. 4 is a more detailed drawing of the base station monitoring system showing subsystems employed for proper operation of the satellite object location system.

Such first code signals are received by a satellite transceiver 4 or a radio transceiver 6 at a remote monitor control center 35 shown in more detail in FIG. 4 where they are recorded and are either directly applied to a computer 42 to cause it to control an electronic display 42D which displays the information defined by the code which identifies the person or the vehicle carrying the portable device 10 including the license plate number thereof. The code may also query memory 42M to derive select alpha-numeric character data and/or video picture information identifying and/or displaying an image of the person, vehicle or object being located and tracked. Signals from the monitor control center 35 may be relayed, for example, to remote police vehicle 41 via the radio transceiver 6. Signals from the satellite transceiver 4 and the radio transceiver 6 pass through encoder/decoder 5 with connection to computer 42. Encoder/decoder 5 provides the necessary communications protocol including signal control envelopes, addressing, and appropriate error correction codes depending upon the quality of the satellite and radio links to be used in the herein described system. The input device 42I is connected to computer 42 and used by the operators of the monitor control center 35 to load appropriate control and program information to computer 42 for proper operation of the monitor control center 35. Also indicated in FIG. 4 are telephone line interfaces to the monitor control center 35 through telephone interface 42T. Telephone interface 42T is in turn connected to computer 42 for the communication of information on a telephone network. As illustrated in FIG. 4, multiple telephone lines 42L are used to ensure simultaneous access to the monitor control center 35 by multiple subscribers to the location system herein described. The lines 62 may be digital data lines for connection to external computers such as personal computers in home base 40 for the entry of digital codes identifying remote units to be located. In addition, analog telephone lines are used to transmit digital location identification codes to the central control or monitoring station 35 using conventional modems and data transmission techniques. With these methods it is possible, for example, to input data to the monitor control center 35 using touch-tone telephone transmission units from the home base unit 40. It is also possible to receive analog voice signals via the communication lines 62 through the telephone interface 42T to be heard by human operators at the control and monitoring station 35. These operators may in turn input control codes through the input device 42I to computer 42 and activate the overall location network to find the remote unit 10 when requested by home base 40.

The memory (ROM) 13 of subsystem 11 or a memory 42M located at the monitor station 35 is addressed by the computer 42 and, using the received earth coordinate codes generated as the object, person or vehicle moves, generates data defining one or more variables such as the path of travel, street or roadway along which the tracked object is moving, its coordinate location or intersection therealong, its speed and direction. Such information is intelligibly indicated at the monitor station 35 along with the information generated by code generating circuits 18,20 which identifies or describes the object from which such codes are transmitted. A person at the monitor station will be informed of the location, path, speed and direction of travel of the object being tracked. Such information in coded form may be recorded and relayed as a code train and/or verbally by radio to one or more substations or mobile receivers in police vehicles for use in ground tracking and in interception of the object, vehicle or foot travelling abductors.

Microphone 31 of unit 10 in FIG. 3 may be supported by housing 11 or may contain its own radio transmitter (not shown) for communicating speech signals output thereby to permit the person or the vehicle carrying unit 10, to verbally communicate with a person at the monitor station 35 via a speaker 30 in response to the data received by short wave receiver 24 connected thereto. Such speech signals may also be digitized at the transmitting device 10 and short wave transmitted to transceiver 6 of the monitor control center 35 or digitized by an analog-to-digital converter thereat for recording and/or further computer processing thereat, such as by of a speech signal analyzing computer 43 which may be employed to recognize the voice of and automatically identify the person or persons speaking into the microphone 31 and/or recognize and generate select code signals indicative of select physical conditions defined by the words of speech spoken into the microphone, such as words indicating a theft, burglary or abduction; descriptions of the thief or kidnapper; location of the person, vehicle or crime being committed, direction and road of travel, etc. Two way Communication between the subsystem 10 and monitor control center 35 may also be effected, if not hazardous to a person or persons at subsystem 11, or for communication with the criminal, via a microphone 31M and short wave transmitter 6 at the monitor station and short wave receiver 24.

Also shown in FIG. 3 is a miniature television camera 28 which may be supported by unit 10 or remote therefrom and connected thereto for communicating its output through an analog-digital converter 29 to transceiver 24. The video picture signal information output by camera 28 may be transmitted via radio transceiver 24 to the monitor station receiver 35 and displayed on display 42D for a pictorial indications at the monitor station of the situation in the vicinity of subsystem 11. A reversible electric motor 28M may be remotely controlled by short wave received control signals generated at the monitor control center 35 by the operator thereof to pan or otherwise vary its scanning aids.

Although the invention has been described in conjunction with the foregoing specific embodiments, many alternatives, variations, and modifications will be apparent to those of ordinary skill in the art. Those alternatives, variations, and modifications are intended to fall within the scope of the following appended claims.

What is claimed is:

1. A method for locating one of a plurality of identifiable, moveable objects on the surface of the earth comprising:
   (a) receiving location-indicating information signals from a plurality of earth satellites at a portable receiver coupled to a moveable object;
   (b) calculating the location of said object using said location-indicating signals;
   (c) transmitting a remotely generated inquiry signal particularly identifying the object;
   (d) when the receiver of the object receives the inquiry signal, transmitting from said receiver to a monitor station signals indicating the calculated location of the object; and
   (e) employing said transmitted signals to intelligibly indicate at the monitor station the location of said object;
   (f) wherein the transmission of calculated location signals from the object is inhibited for a time by entering an inhibiting personal identification number at the object.

2. A method in accordance with claim 1 further comprising:
   (g) employing the object-identifying information contained in said inquiry signal to access a database and retrieve additional information relating to the object; and
   (h) displaying the additional information retrieved from the database at the monitor station.

3. A method in accordance with claim 2 wherein said additional information relates to a physical characteristic of the object.

4. A method in accordance with claim 2 which includes displaying a physical description of said object.

5. A method in accordance with claim 4 wherein the object is an automotive vehicle, which further includes displaying the license plate number of registration of the vehicle.

6. A method in accordance with claim 1 wherein said location-indicating signals are transmitted in encrypted form.

7. A method in accordance with claim 6 wherein said location-indicating signals are transmitted in encrypted form by means of a specific public key, said encrypted form being decipherable only with the use at the monitor station of a corresponding private key.

8. A method in accordance with claim 1 wherein said location-indicating signals are transmitted to a select monitor station only when the receiver receives a remotely generated inquiry signal identifying the particular object and containing a valid personal identification number.

9. A method in accordance with claim 8 wherein the transmission of calculated location signals from the object after receipt of the inquiry signal is inhibited by the inhibiting personal identification number previously entered at the object to be located, and wherein the inhibiting number and the activating number are different.

10. The method of claim 9 wherein the inhibiting personal identification number may be overridden by a higher-level received emergency personal identification number.

11. A method in accordance with claim 1 further comprising using map data to convert the location information to a street of travel of said object and indicating the street at the monitor station.

12. A method in accordance with claim 1 wherein the acts in steps (a) to (e) are repeated a number of times to track the movement of said object.

13. A method in accordance with claim 12 wherein the acts in steps (a) to (e) are repeated a number of times in a timed sequence to track the movement of the object.

14. A method in accordance with claim 13 further comprising employing said sequence of location information to compute the direction of travel and speed of said object and displaying the computed information at the monitor station.

15. A method in accordance with claim 1 wherein the inquiry signal is remotely generated and transmitted only after recognition of a valid activating personal identification number.

16. A method in accordance with claim 15 wherein the inquiry signal is remotely generated at and transmitted to the receivers from a central station, and wherein recognition of a valid activating personal identification number is attempted at the central station.

17. A method in accordance with claim 15 wherein:
  (g) the inquiry signal is transmitted to the receivers from a central station;
  (h) a request for the inquiry signal is conveyed via telephone lines from a location remote from the central station to the central station;
  (i) an input is conveyed with the request for inquiry signal; and
  (j) recognition of a valid activating personal identification number is attempted at the central station by comparing the input with a prestored number associated with the particular object addressed by the inquiry signal.

18. A method in accordance with claim 1 wherein the inhibiting personal identification number may be overridden by a higher-level emergency personal identification number received from the central monitor station.

19. A method in accordance with claim 1 wherein the remotely generated inquiry signal is generated at the monitor station and broadcast to the receiver via low-earth-orbit satellite.

20. A method in accordance with claim 1 wherein the signals indicating location are transmitted to the monitor station via low-earth-orbit satellite.

21. A system for tracking an identifiable moving object travelling a path on earth comprising:
  (a) a receiver supported by said object capable of receiving signals from global positioning system satellites;
  (b) a computer coupled to the receiver, supported by said object, and programmed to calculate the location of the object from signals received by the receiver from a plurality of the GPS satellites and to generate on an output location-indicating signals;
  (c) a comparator coupled of the receiver and the computer so as to activate the computer when the receiver receives a remotely generated inquiry signal containing an identification of the object;
  (d) a transmitter supported by the object and coupled to the output of the computer;
  (e) a monitor station including a central receiver suited to receive the location signals and an electronic display coupled to the central receiver and capable of indicating the location of said object; and
  (f) an input device coupled to the comparator, wherein a valid blocking personal identification number entered on the input device blocks the transmission of the location signals for a time.

22. A system in accordance with claim 21 further comprising a storage, and wherein said comparator is coupled to the storage to compare at least a portion of the inquiry signal against an activating personal identification number stored in the storage.

23. A system in accordance with claim 22 further comprising an input device coupled to the storage.

24. A system in accordance with claim 21 wherein said object is a motor vehicle.

25. A system in accordance with claim 24 further comprising a map-translator at the monitor station coupled to the central receiver and programmed to translate the location information transmitted by the object into information regarding the street along which said vehicle is travelling.

26. A system in accordance with claim 24 further comprising a computer at the monitor station programmed to calculate the direction and speed of travel of said vehicle.

27. A system in accordance with claim 24 further comprising a sensor placed at the vehicle to detect unauthorized movement of said vehicle and coupled to transmit an indication of same to said monitor station.

28. A system in accordance with claim 21 further comprising an encryption device coupled to the transmitter and a decryption device coupled to the central receiver.

29. A system in accordance with claim 28 wherein said encryption and decryption devices operate using a public key-private key security system.

30. A system in accordance with claim 21 wherein said monitor station further comprises a database containing descriptive information relating to a plurality of objects.

31. A system in accordance with claim 21 wherein the monitor station further includes a central transmitter configured to transmit the inquiry signal and an input device capable of receiving an activating personal identification number, and wherein the central transmitter is coupled to the input device so as to be activated to transmit the inquiry signal only upon receipt of a valid activating personal identification number on the input device.

32. A system in accordance with claim 21 wherein the monitor station further includes a central transmitter configured to transmit the inquiry signal and an automatically monitored input telephone line configured to receive a request for transmission of the inquiry signal, and wherein the central transmitter is coupled to the telephone line so as to be activated to transmit the inquiry signal upon request on the input line initiated remote from the monitor station.

33. A system in accordance with claim 32 further comprising an input device at the central location capable of receiving an activating personal identification number from the telephone line, and wherein the central transmitter is coupled to the input device so as to be activated to transmit the inquiry signal only upon receipt of a valid activating personal identification number at the input device.

34. A system in accordance with claim 21 wherein the blocking personal identification number may be overridden by receipt of a higher-level emergency personal identification number.

35. A system in accordance with claim 21 wherein the monitor station further includes a central transmitter configured to transmit the inquiry signal, and wherein the inquiry signal is generated at the central location and broadcast from the central transmitter to the receiver via low-earth-orbit satellite.

36. A system in accordance with claim 21 wherein the transmitter is configured to transmit the location signals to the central receiver via low-earth-orbit satellite.

37. A method for locating an identifiable one of a plurality of objects in motion comprising:
  (a) carrying with each of a plurality of objects an electronic global positioning circuit, a transceiver, and an identifying code matcher;
  (b) when it is desired to locate said identifiable object, broadcasting from a central location to the transceivers an activation signal including an identification code indicative of the object;

(c) determining the identifiable object by using the code marchers to attempt to match the broadcasted identification code;

(d) causing the transceiver of the object whose code marcher matches the identification code to transmit to the central location signals representative of the matching object's location, as determined by the matching object's global positioning circuit;

(e) receiving said location signals with a receiver at the central location; and (f) employing said location signals to intelligibly indicate at the central location information including a description of said object and its location;

(g) wherein the transmission of the location signals from the object is inhibited for a time by entering an inhibiting personal identification number at the object.

38. A method in accordance with claim 37 further comprising re-transmitting the information from the central location to a remote receiver in a vehicle.

39. A method in accordance with claim 37 wherein said object is a person and the description of the object in step (d) includes an image of said person.

40. A method in accordance with claim 39 further comprising re-transmitting image signals of said person and signals indicative of the location of said person from the central location to a remote receiver in a police vehicle and employing said image signals to display an image of said person and intelligibly indicate the location of said person in said vehicle.

41. A method in accordance with claim 37 wherein said object is a motor vehicle and further comprising displaying at the central location information indicating the make, year, and color of said vehicle.

42. A method in accordance with claim 41 further comprising displaying information appearing on the license plate of said vehicle.

43. A method in accordance with claim 37 wherein the object is a motor vehicle and further comprising repeating (b) through (f) to calculate the path and direction of travel of said vehicle and to display same on a monitor at said central location.

44. A method in accordance with claim 43 further comprising computer analyzing the sequence of location signals resulting from said repeated steps to determine the speed and direction of travel of said object.

45. A method in accordance with claim 37 further comprising radio-transmitting speech information between the central location and the transceiver of the object whose code matcher matches the identification code.

46. A method in accordance with claim 37 wherein said location signals are transmitted to the central location in encrypted form.

47. A method in accordance with claim 37 further comprising generating video signals using a television camera to scan an image field adjacent to said object whose code matcher matches the identification code, and transmitting the resulting video signals to the central location.

48. A method in accordance with claim 37 wherein broadcasting the activation signal occurs only when the central location receives an input matching a prestored activating personal identification number associated with the identification code indicative of the identifiable object.

49. A method in accordance with claim 37 further comprising generating a request for broadcasting the activation signal remote from the central location and conveying the request from the generation site to the central location via telephone line.

50. A method in accordance with claim 37 wherein the location signals are transmitted to the central location via low-earth-orbit satellite.

51. A method in accordance with claim 37 wherein the activation signal is generated at the central location and broadcast to the transceiver via low-earth-orbit satellite.

52. A method for locating one of a plurality of identifiable, moveable objects on the surface of the earth comprising:

(a) receiving location-indicating information signals from a plurality of earth satellites at a portable receiver coupled to a moveable object;

(b) calculating the location of said object using said location-indicating signals:

(c) transmitting a remotely generated inquiry signal particularly identifying the object and containing an activating personal identification number:

(d) when the receiver object receives the inquiry signal and a valid activating personal identification number identification number that is identical to another activating personal identification number entered at the object, transmitting from said receiver to a monitor station signals indicating the calculated location of the object; and (e) employing said transmitted signals to intelligibly indicate at the monitor station the location of said object.

53. A system for tracking an identifiable moving object travelling a path on earth comprising:

(a) a receiver supported by said object capable of receiving signals from global positioning system satellites;

(b) a computer coupled to the receiver, supported by said object, and programmed to calculate the location of the object from signals received by the receiver from a plurality of the GPS satellites and to generate on an output location-indicating signals;

(c) a transmitter supported by the object and coupled to the output of the computer;

(d) an input device supported by the object;

(e) a comparator coupled to the receiver, the input device, and the computer and wherein the computer is structured to cause the transmitter to transmit the location signals only when an activating personal identification number is entered on the input device matching at least a portion of a remotely generated inquiry signal containing an identification of the object received by the receiver; and (f) a monitor station including a central receiver suited to receive the location signals, and an electronic display coupled to the central receiver and capable of indicating the location of said object.

* * * * *